(12) United States Patent
Pence et al.

(10) Patent No.: US 11,753,170 B2
(45) Date of Patent: Sep. 12, 2023

(54) AIRCRAFT SEAT WITH EXTENDABLE AND RETRACTABLE REAR SECTION

(71) Applicant: B/E Aerospace, Inc., Winston-Salem, NC (US)

(72) Inventors: Tracy Pence, King, NC (US); Aaron D. LaPrade, Winston-Salem, NC (US); Twinkle V. Jacob, Winston-Salem, NC (US); Catalin Bunea, Miramar, FL (US); Horng Lin, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 115 days.

(21) Appl. No.: 17/216,105

(22) Filed: Mar. 29, 2021

(65) Prior Publication Data

US 2021/0300566 A1    Sep. 30, 2021

Related U.S. Application Data

(60) Provisional application No. 63/002,067, filed on Mar. 30, 2020.

(51) Int. Cl.
  B64D 11/06    (2006.01)
(52) U.S. Cl.
  CPC ...... B64D 11/0641 (2014.12); B64D 11/0606 (2014.12); B64D 11/0642 (2014.12)
(58) Field of Classification Search
  CPC ...... B60N 2/832; B60N 2/34; B64D 11/0641; B64D 11/0642
  See application file for complete search history.

(56) References Cited

U.S. PATENT DOCUMENTS

| 2,652,101 | A | * | 9/1953 | Samsky | B60N 2/832 |
|           |   |   |        |        | 297/410 |
| 3,057,662 | A | * | 10/1962 | Johnson | B64D 11/0643 |
|           |   |   |        |         | 297/62 |
| 3,065,023 | A | * | 11/1962 | Spound | B60N 2/34 |
|           |   |   |        |         | 297/423.26 |
| 5,340,191 | A |   | 8/1994 | May |  |

(Continued)

FOREIGN PATENT DOCUMENTS

| CN | 208947162 U | 6/2019 |
| DE | 102007057809 A1 | 6/2009 |

OTHER PUBLICATIONS

EP Search Report for European Application No. 21166036.0 dated Sep. 2, 2021, 8 pages.

*Primary Examiner* — Christopher D Hutchens
(74) *Attorney, Agent, or Firm* — Sulter Swantz pc llo (57) ABSTRACT

An aircraft seat may include a seat pan cushion coupled to a seat base. The aircraft seat may include a seat back cushion. The aircraft seat may include an auxiliary rear section. The auxiliary rear section may be configured to transition between an extended position and a retracted position. The seat pan cushion and the seat back cushion may be configured to transition between a first position and a second position. The auxiliary rear section may be configured to be in the extended position when the seat pan cushion and the seat back cushion are in the first position. The auxiliary rear section may be configured to be in the retracted position when the seat pan cushion and the seat back cushion are in the second position.

13 Claims, 10 Drawing Sheets

(56) References Cited

U.S. PATENT DOCUMENTS

| | | | |
|---|---|---|---|
| 5,628,547 A | 5/1997 | Matsumiya | |
| 6,192,565 B1* | 2/2001 | Tame | B60N 2/874 |
| | | | 297/410 |
| 8,894,142 B2 | 11/2014 | Alexander et al. | |
| 9,446,693 B2 | 9/2016 | Morilhat et al. | |
| 10,035,442 B2 | 7/2018 | Kondrad et al. | |
| 10,427,573 B2 | 10/2019 | Ishihara et al. | |
| 10,518,680 B2 | 12/2019 | Chehade et al. | |
| 2007/0040434 A1 | 2/2007 | Plant | |
| 2011/0101738 A1* | 5/2011 | Jensen | B60N 2/812 |
| | | | 297/410 |
| 2011/0285194 A1* | 11/2011 | Marom | B60N 2/856 |
| | | | 297/404 |
| 2013/0015686 A1* | 1/2013 | Islam | B64D 11/0624 |
| | | | 297/216.12 |
| 2017/0029118 A1* | 2/2017 | Ehrmann | B64D 11/064 |
| 2020/0010199 A1 | 1/2020 | Ferguson et al. | |
| 2020/0047890 A1* | 2/2020 | Simpson | B64D 11/0643 |
| 2020/0062156 A1* | 2/2020 | Little | B60N 2/0224 |

\* cited by examiner

AIRCRAFT SEAT WITH EXTENDABLE AND RETRACTABLE REAR SECTION

CROSS-REFERENCE TO RELATED APPLICATIONS

The present application is related to and claims benefit of the earliest available effective filing date from the following applications: the present application claims the benefit of U.S. Provisional Application Ser. No. 63/002,067, filed Mar. 30, 2020, which is incorporated herein by reference in the entirety.

BACKGROUND

Select aircraft seats may be required to meet a minimum seat back height requirement. Where the select aircraft seats are installed within passenger compartments, the passenger compartment may need to be increased in size to accommodate the select aircraft seat. In turn, this may result in a loss of floor space in an aircraft cabin including the passenger compartments with the select aircraft seats.

SUMMARY

An aircraft seat is disclosed, in accordance with one or more embodiments of the disclosure. The aircraft seat may include a seat pan cushion coupled to a seat base. The aircraft seat may include a seat back cushion. The aircraft seat may include an auxiliary rear section. The auxiliary rear section may be configured to transition between an extended position and a retracted position. The seat pan cushion and the seat back cushion may be configured to transition between a first position and a second position. The auxiliary rear section may be configured to be in the extended position when the seat pan cushion and the seat back cushion are in the first position. The auxiliary rear section may be configured to be in the retracted position when the seat pan cushion and the seat back cushion are in the second position.

In some embodiments, the first position may be an upright position. The second position may be a bed position.

In some embodiments, the auxiliary rear section may be configured to transition from the extended position to the retracted position while the seat pan cushion and the seat back cushion transition from the first position to the second position.

In some embodiments, the auxiliary rear section may be configured to transition from the retracted position to the extended position while the seat pan cushion and the seat back cushion transition from the second position to the first position.

In some embodiments, the auxiliary rear section may be configured to transition from the extended position to the retracted position before the seat pan cushion and the seat back cushion transition from the first position to the second position.

In some embodiments, the auxiliary rear section may be configured to transition from the retracted position to the extended position after the seat pan cushion and the seat back cushion transition from the second position to the first position.

In some embodiments, the aircraft seat may include a head rest coupled to the seat back cushion. The aircraft seat may include a primary rear section. The auxiliary rear section may be coupled to the primary rear section. A surface of the auxiliary rear section may be proximate to a surface of the head rest when the auxiliary rear section is in the extended position.

In some embodiments, a top edge of the auxiliary rear section may be at an extended height relative to the head rest when the auxiliary rear section is in the extended position.

In some embodiments, a top edge of the auxiliary rear section may be at a retracted height relative to the head rest when the auxiliary rear section is in the retracted position.

In some embodiments, the auxiliary rear section may be configured to transition between the extended position and the retracted position via a cavity defined within the primary rear section.

In some embodiments, the auxiliary rear section may be configured to transition between the extended position and the retracted position along an exterior surface of the primary rear section.

In some embodiments, the primary rear section may be a head rest for the aircraft seat. The head rest may be coupled to the seat back cushion. The auxiliary rear section may be configured to transition between the extended position and the retracted position via a cavity defined within the seat back cushion.

A passenger compartment of an aircraft cabin is disclosed, in accordance with one or more embodiments of the disclosure. The passenger compartment may include a privacy shell. The passenger compartment may include an aircraft seat positioned within the privacy shell. The aircraft seat may include a seat pan cushion coupled to a seat base. The aircraft seat may include a seat back cushion. The aircraft seat may include an auxiliary rear section. The auxiliary rear section may be configured to transition between an extended position and a retracted position. The seat pan cushion and the seat back cushion may be configured to transition between a first position and a second position. The auxiliary rear section may be configured to be in the extended position when the seat pan cushion and the seat back cushion are in the first position. The auxiliary rear section may be configured to be in the retracted position when the seat pan cushion and the seat back cushion are in the second position.

In some embodiments, the passenger compartment may include an ottoman. The ottoman may be positioned proximate to the aircraft seat within the privacy shell.

In some embodiments, the ottoman and the aircraft seat may be configured to form a bed surface when the seat pan cushion and the seat back cushion are in the first position.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-5B in general illustrate an aircraft seat with an extendable seat section, in accordance with one or more embodiments of the disclosure.

Aircraft seats installed within an aviation environment may be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), the Society of Automotive Engineers (SAE), or any other standards setting organization or company; the Radio Technical Commission for Aeronautics (RTCA) or any other guidelines agency or organization; or the like.

For example, select aircraft seats such as aft-facing or rearward-facing seats may be required to meet a minimum seat back height requirement, set forth by the SAE Aerospace Standard (AS) 8049 § 3.2.10. Under the SAE AS 8049 § 3.2.10, the aft-facing or rearward-facing seats are required to have a back height sufficient to provide 36.5 inches (930 mm) of support for an occupant as measured from a seat reference point (SRP) to a top of the seat back or headrest along a seat back tangent line with the seat in a position identified for taxi, takeoff, and landing (e.g., a TTOL position). In contrast, a forward-facing seat may only have a back height of 31 or 32 inches.

Where the select aircraft seats are installed within passenger compartments, the passenger compartment may need to have increased dimensions to accommodate the select aircraft seat due to the minimum seat back height requirement, as compared to the dimensions for a passenger compartment including a forward-facing aircraft seat not required to meet the SAE AS 8049 § 3.2.10. In turn, this may result in a loss of floor space in an aircraft cabin including the passenger compartments with the select aircraft seats.

As such, it would be desirable to provide an aircraft seat configured to meet the minimum seat back height requirement, set forth by the SAE AS 8049 § 3.2.10, in a reduced amount of aircraft cabin floor space. In addition, it would be desirable to provide an aircraft seat that fits within a passenger compartment without the passenger compartment being modified to include additional geometrical constraints to accommodate the minimum seat back height requirement, set forth by the SAE AS 8049 § 3.2.10 (e.g., requiring an extended length, requiring a reduced seat pitch, requiring additional seat translation, or the like).

FIGS. 1-3D in general illustrate an aircraft cabin 100 including one or more aircraft seats 102, in accordance with one or more embodiments of the disclosure.

An aircraft seat 102 may include a seat back cushion 104. The aircraft seat 102 may include a head rest 106. The seat back cushion 104 and the head rest 106 may be fixed to a seat back frame of the aircraft seat 102. It is noted herein, however, that at least one of the seat back cushion 104 or the head rest 106 may be movable relative to the seat back frame of the aircraft seat 102 (e.g., adjustable, removable, or the like).

The aircraft seat 102 may include a primary rear section 108. The primary rear section 108 may be fixed to the seat back frame of the aircraft seat 102. It is noted herein, however, that the primary rear section 108 may form a portion of the seat back frame of the aircraft seat 102.

The aircraft seat 102 may include an auxiliary rear section 110. The auxiliary rear section 110 may be offset a select distance from a passenger, as compared to a distance between the head rest 106 and the passenger. The auxiliary rear section 110 may be extendable and retractable from a cavity defined with the primary rear section 108 (e.g., from a hole or cut-out 112) via one or more internal assemblies. For example, the auxiliary rear section 110 may be extendable and retractable via one or more mechanical assemblies. For instance, the one or more mechanical assemblies may include, but are not limited to, a combination of toggles (e.g., buttons, switches, levers, or the like), linkages, cam followers, cables, gears, interlocking assemblies, or the like. By way of another example, the auxiliary rear section 110 may be extendable and retractable via one or more electrical assemblies. For instance, the one or more electrical assemblies may include, but are not limited to, one or more actuators (e.g., motors, or the like). In addition, the auxiliary rear section 110 may be extendable and retractable via a combination of one or more mechanical assemblies and one or more electrical assemblies (e.g., one or more motors coupled to one or more mechanical assembly components, or the like).

Referring now to FIGS. 2A-2C and FIGS. 3A-3D, the aircraft seat 102 may be transitionable between one or more positions. For example, the one or more positions may include, but not limited to, an upright or raised position, one or more lounge or reclined positions, and/or a lie-flat or bed position. For instance, the aircraft seat 102 may be configured to pass through the one or more lounge or reclined positions when transitioning between the upright or raised position and the lie-flat or bed position. It is noted herein, however, that the one or more lounge or reclined positions of the aircraft seat 102 may be separate from the one or more upright or raised positions and/or the one or more lie-flat or bed positions. Therefore, the above description should not be interpreted as a limitation on the present disclosure but merely an illustration.

Figure 1:
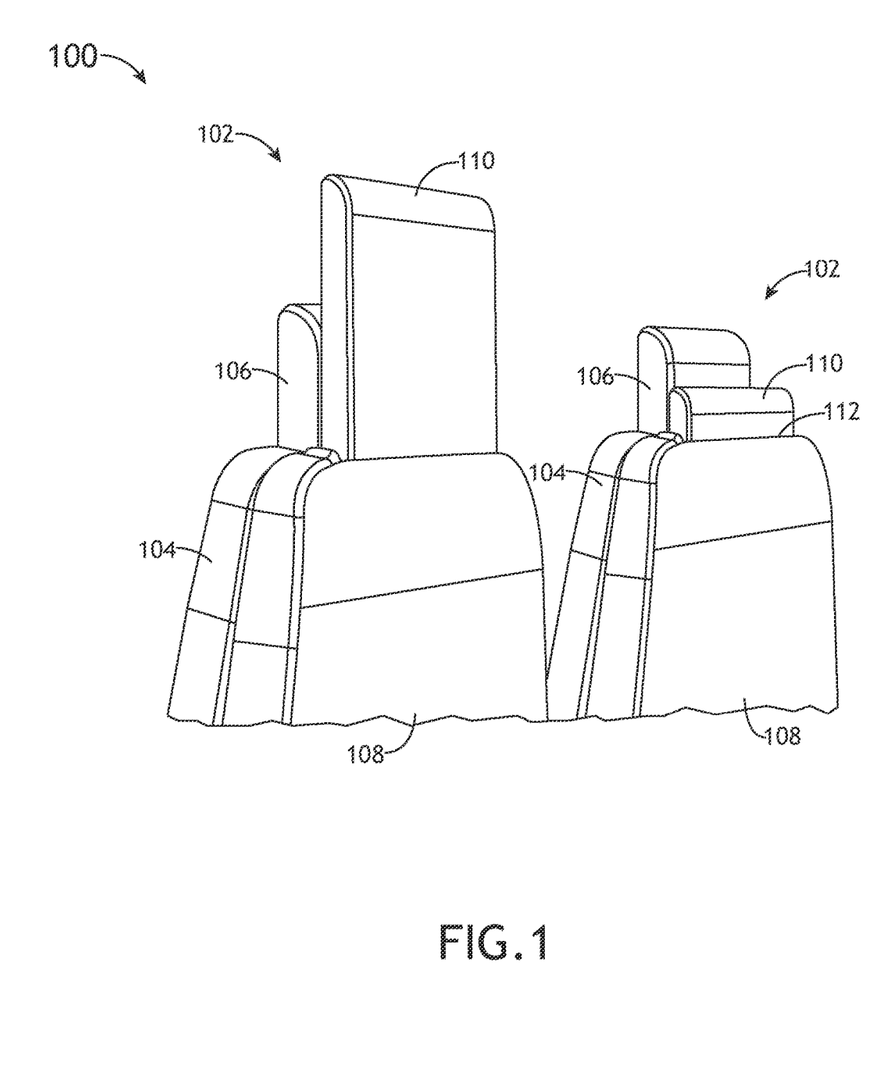
FIG. 1 illustrates a perspective view of an aircraft seat with an extendable and retractable rear section, in accordance with one or more embodiments of the disclosure.
Figure 2A:
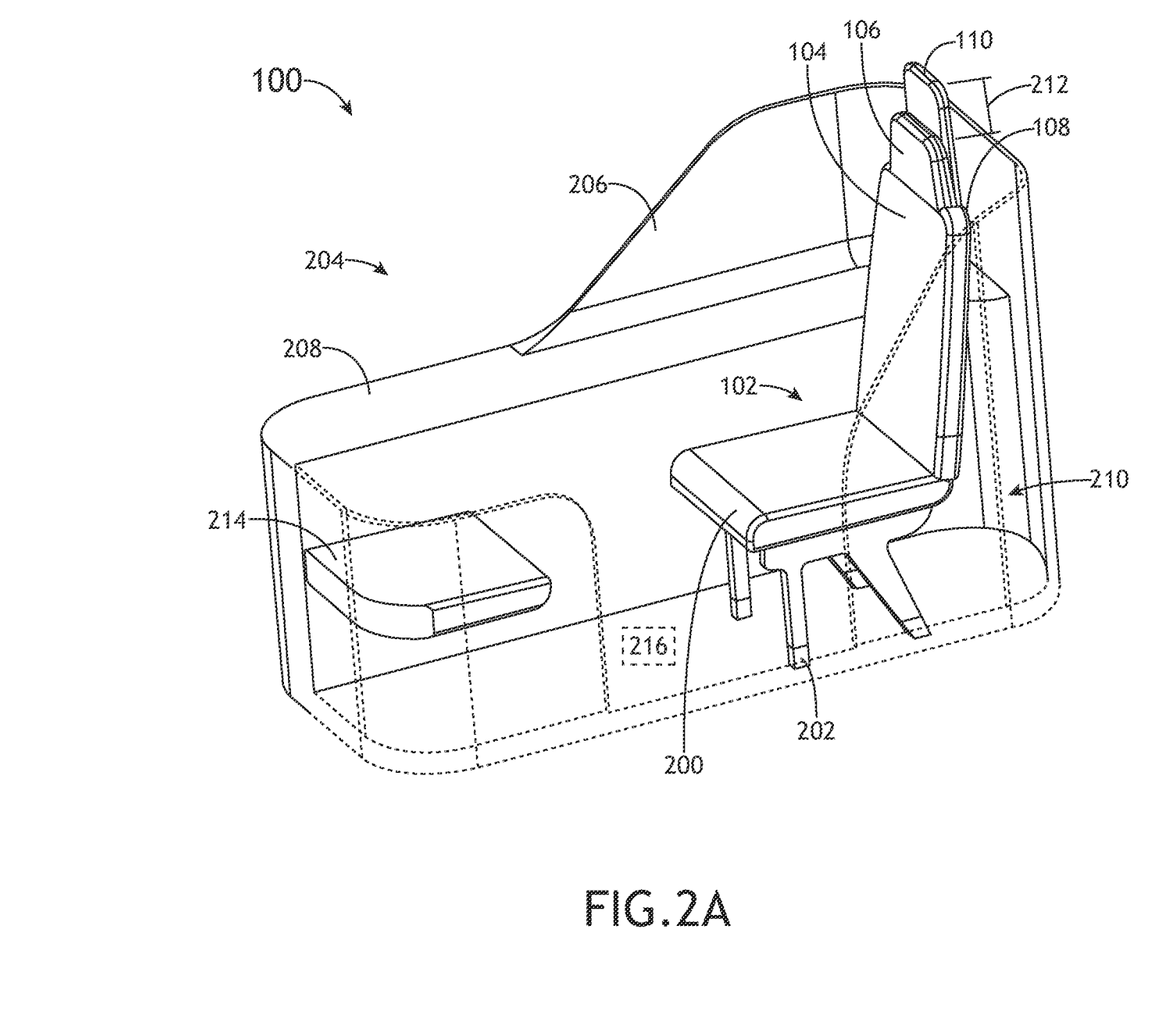
FIG. 2A illustrates a perspective view of a passenger compartment including an aircraft seat with an extendable and retractable rear section, in accordance with one or more embodiments of the disclosure.
Figure 2B:
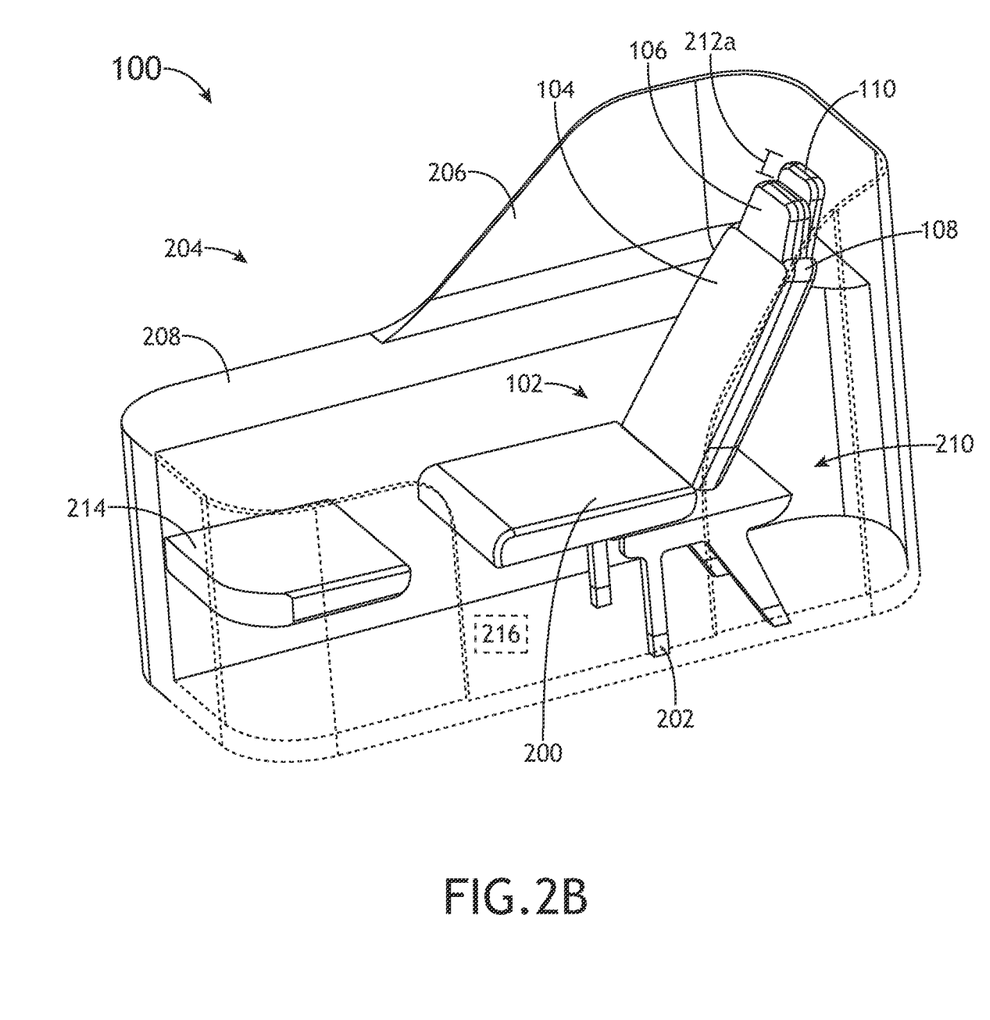
FIG. 2B illustrates a perspective view of a passenger compartment including an aircraft seat with an extendable and retractable rear section, in accordance with one or more embodiments of the disclosure.
Figure 2C:
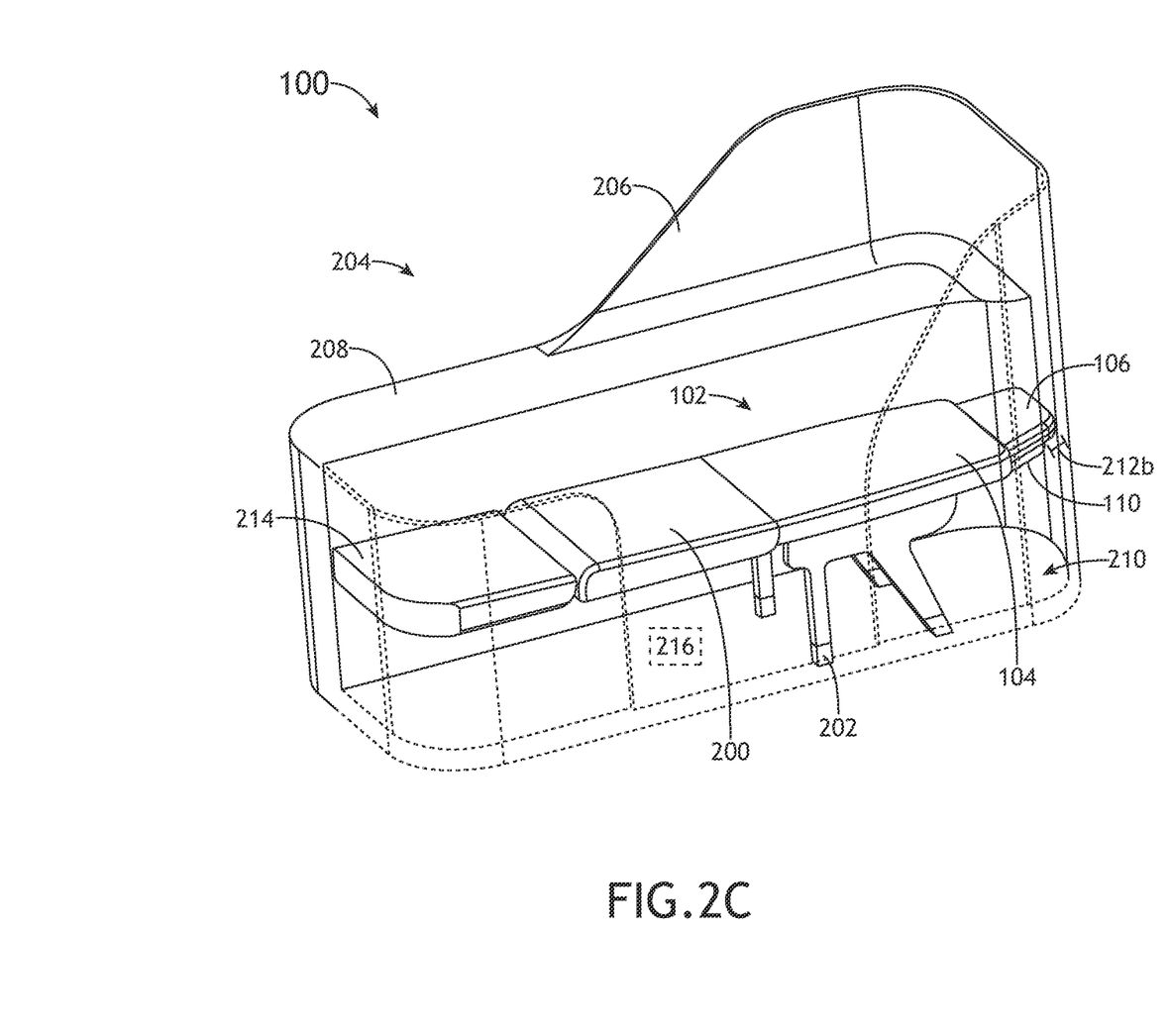
FIG. 2C illustrates a perspective view of a passenger compartment including an aircraft seat with an extendable and retractable rear section, in accordance with one or more embodiments of the disclosure.
Figure 3A:
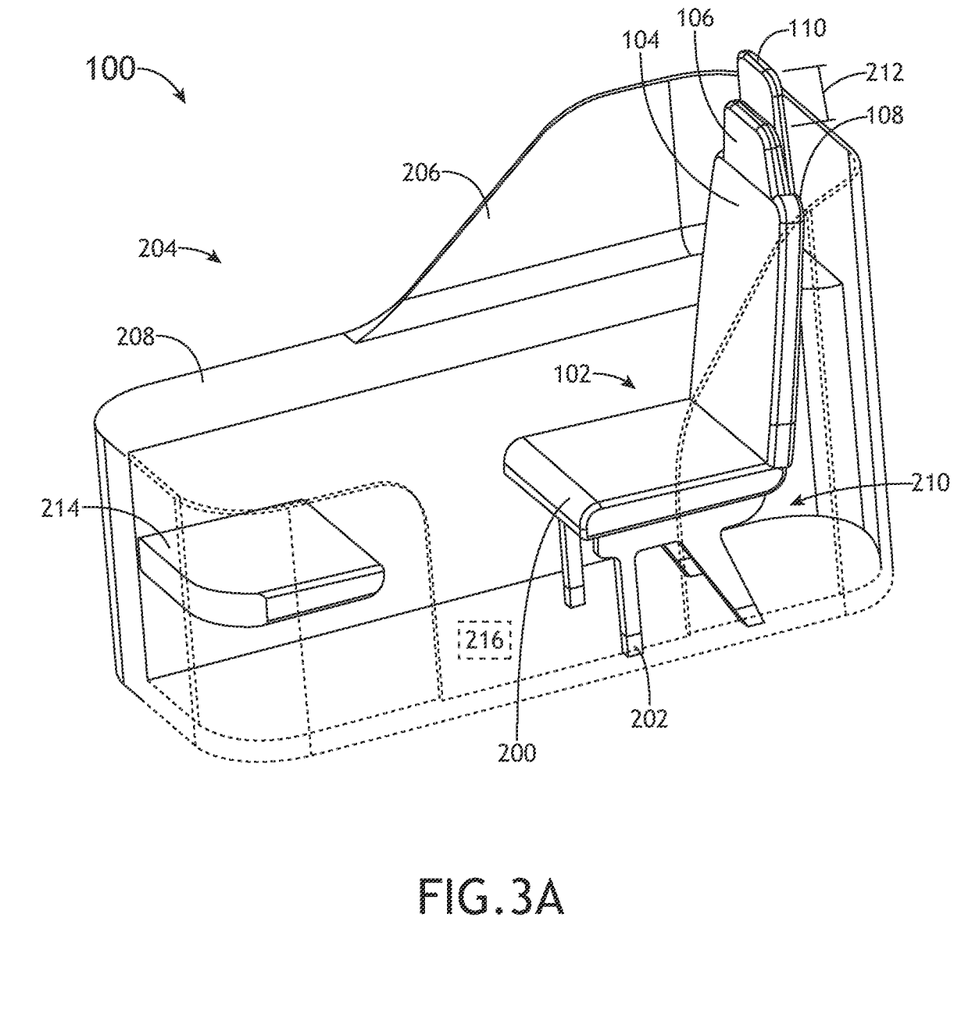
FIG. 3A illustrates a perspective view of a passenger compartment including an aircraft seat with an extendable and retractable rear section, in accordance with one or more embodiments of the disclosure.
Figure 3B:
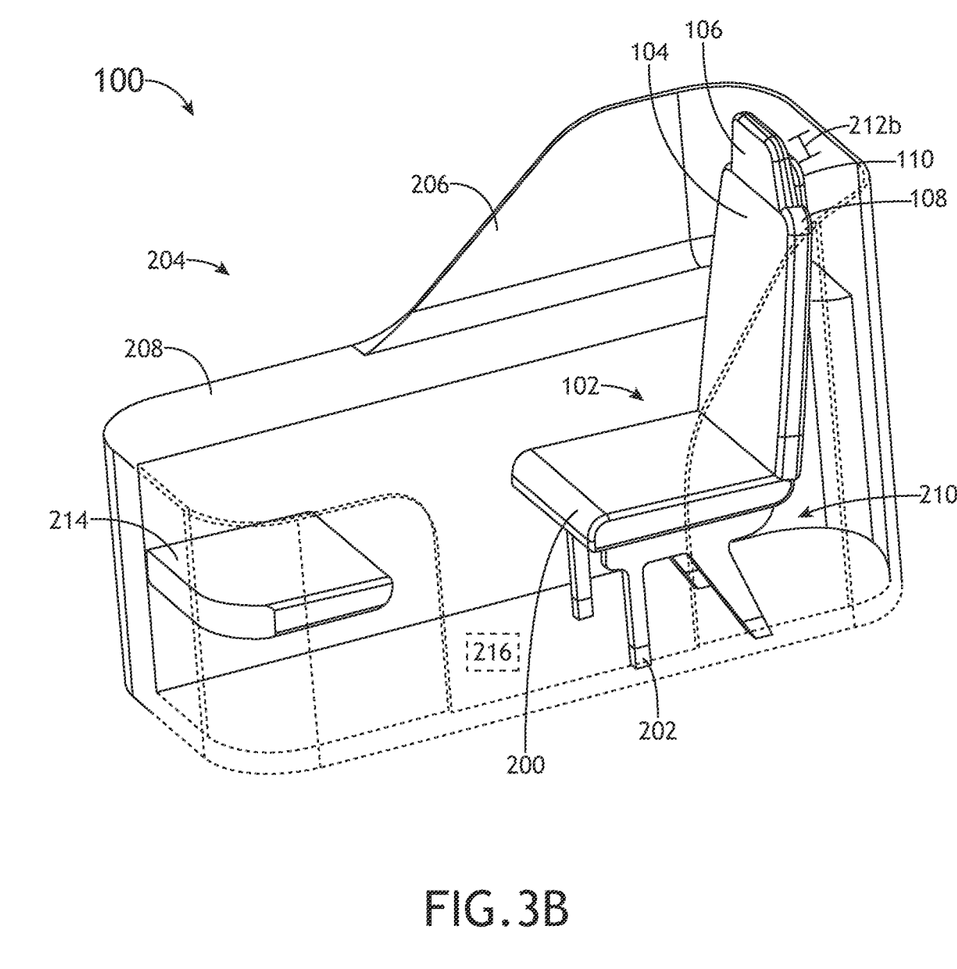
FIG. 3B illustrates a perspective view of a passenger compartment including an aircraft seat with an extendable and retractable rear section, in accordance with one or more embodiments of the disclosure.
Figure 3C:
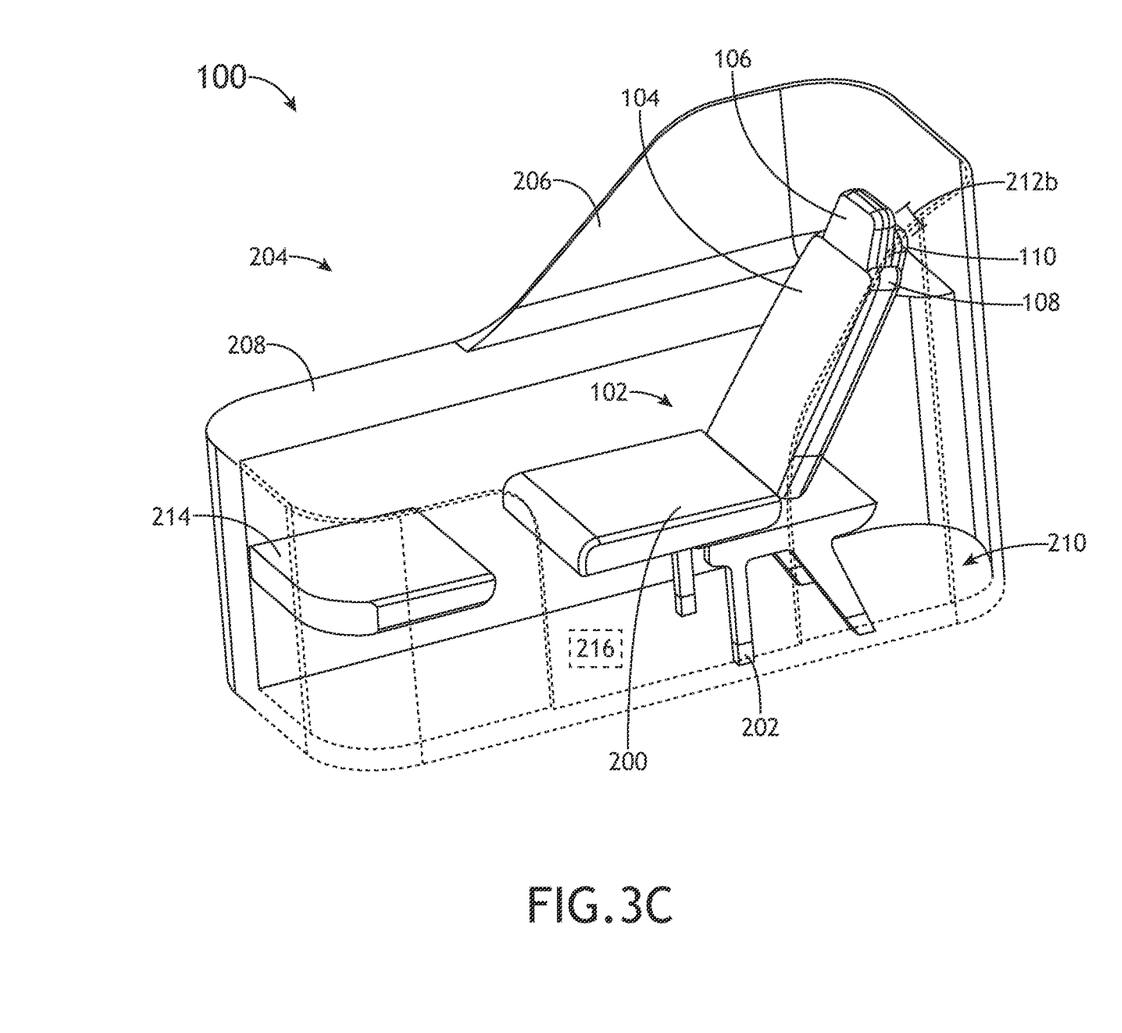
FIG. 3C illustrates a perspective view of a passenger compartment including an aircraft seat with an extendable and retractable rear section, in accordance with one or more embodiments of the disclosure.
Figure 3D:
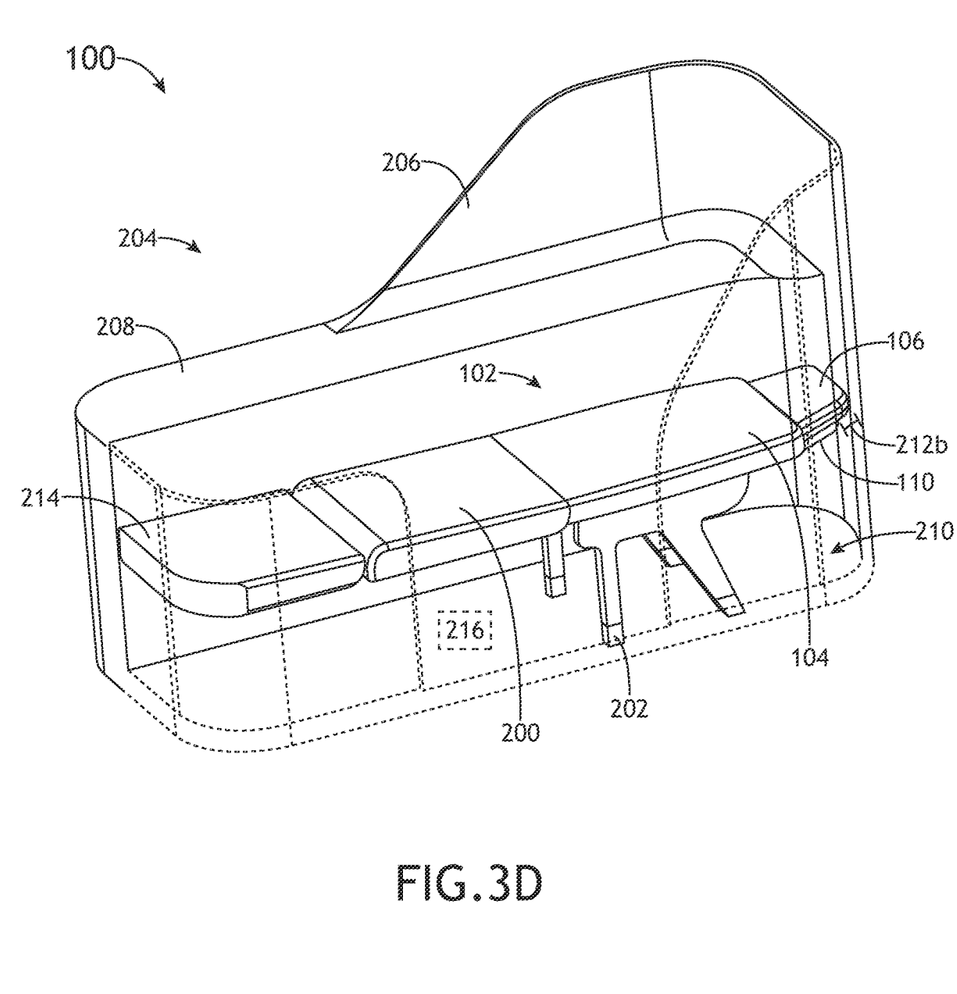
FIG. 3D illustrates a perspective view of a passenger compartment including an aircraft seat with an extendable and retractable rear section, in accordance with one or more embodiments of the disclosure.
Figure 4:
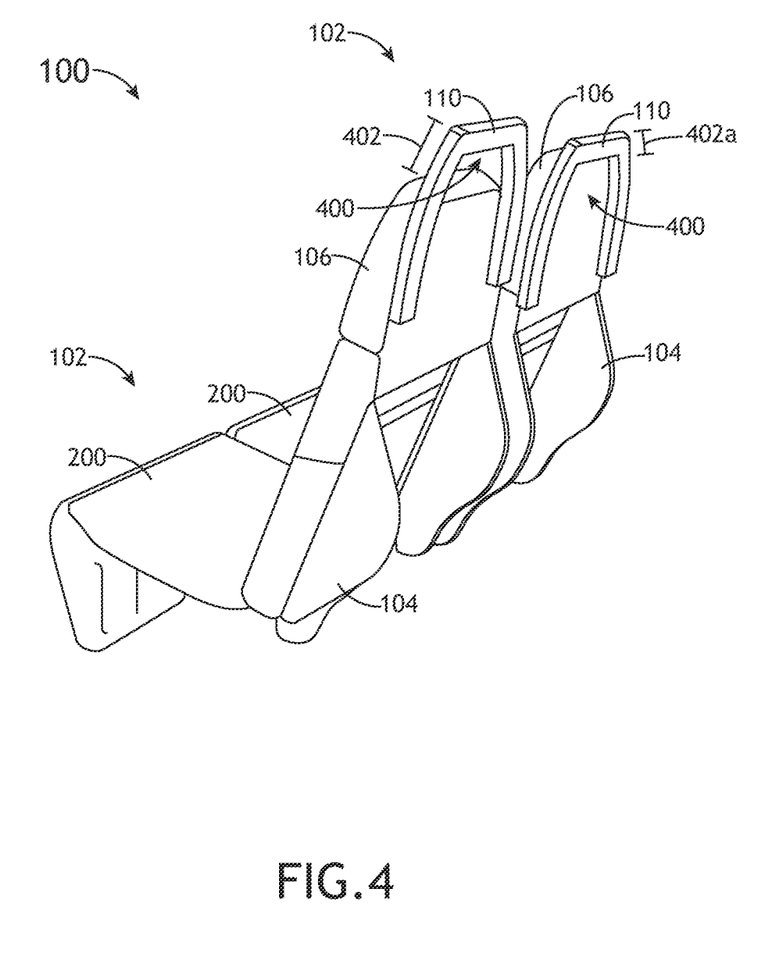
FIG. 4 illustrates a perspective view of an aircraft seat with an extendable and retractable rear section, in accordance with one or more embodiments of the disclosure.
Figure 5A:
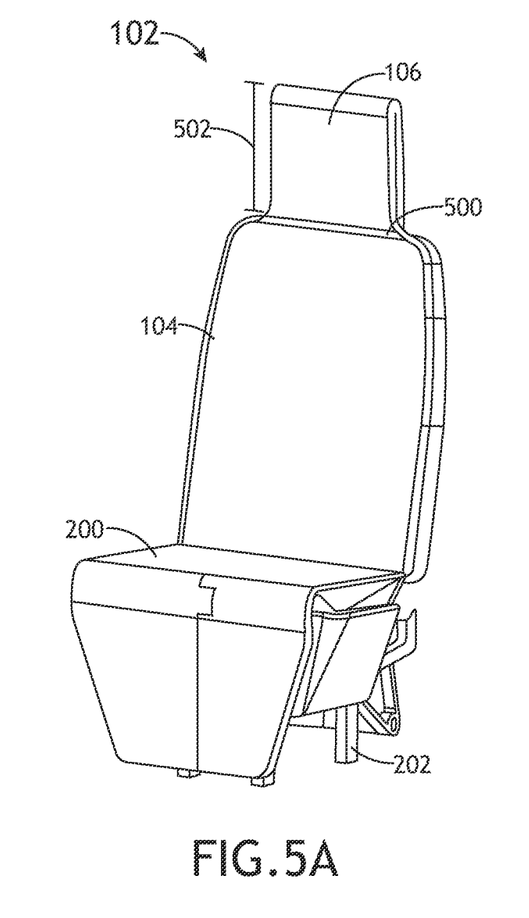
FIG. 5A illustrates a perspective view of an aircraft seat with an extendable and retractable rear section, in accordance with one or more embodiments of the disclosure.
Figure 5B:
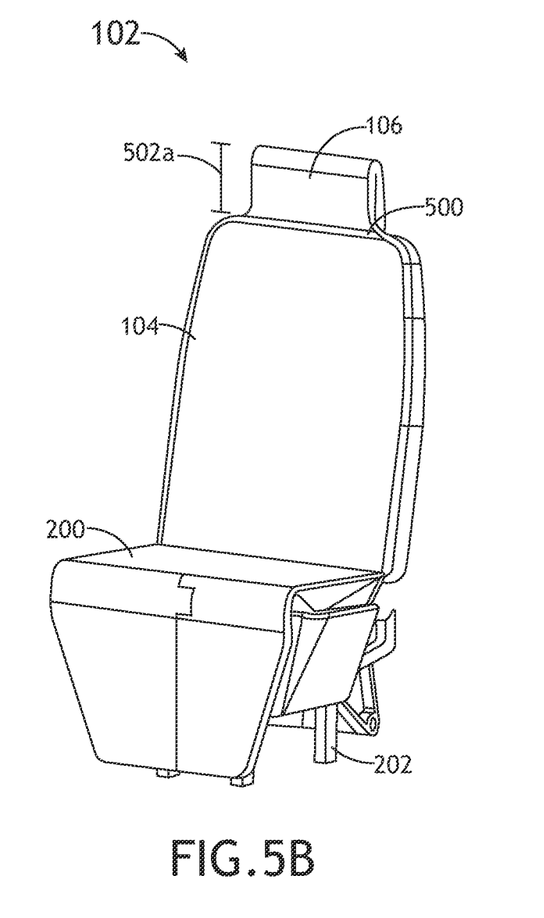
FIG. 5B illustrates a perspective view of an aircraft seat with an extendable and retractable rear section, in accordance with one or more embodiments of the disclosure.

The aircraft seat 102 may include a seat pan cushion 200. The seat pan cushion 200 may include one or more sections. For example, the seat pan cushion 200 may include a single seat section (e.g., as illustrated in FIGS. 2A-3D). By way of another example, the seat pan cushion may include multiple sections, where a first section is a seat section and at least a second section is deployed for use when the aircraft seat 102 is in the lie-flat or bed position (e.g., as illustrated in FIGS. 4, 5A, and 5B).

The aircraft seat 102 may include a seat frame 202. The seat pan cushion 200 may be fixed to the seat frame 202 of the aircraft seat 102. It is noted herein, however, that the seat pan cushion 200 may be movable relative to the seat frame 202 of the aircraft seat 102 (e.g., adjustable, removable, or the like).

The aircraft seat 102 may be installed within a passenger compartment 204. Although embodiments of the disclosure illustrate the passenger compartment 204 as including a single aircraft seat 102, it is noted herein the passenger compartment 204 may include multiple aircraft seats 102. Therefore, the above description should not be interpreted as a limitation on the present disclosure but merely an illustration.

The passenger compartment 204 may include a privacy shell 206 with one or more privacy shell elements. The privacy shell 206 may include an opening within the one or more privacy shell elements into the passenger compartment 204. The passenger compartment 204 may include a door for the opening. For example, the door may swing or slide into an open position against a privacy shell element. By way of another example, a privacy shell element may be at least partially hollow, and the door may be slid into a cavity defined in the one or more privacy shell elements.

The passenger compartment 204 may include one or more monuments 208. The aircraft seat 102 may be configured to avoid contact with the one or more monuments 208 when transitioning between positions (e.g., between the upright or raised position and the lie-flat or bed position).

At least a portion of the passenger compartment 204 (e.g., at least a portion of the privacy shell 206, a monument 208 of the one or more monuments 208, or the like) may conform to a portion of the aircraft seat 102. In this regard, the amount of aircraft cabin floor space necessary for the passenger compartment 204 may be reduced.

In general, the aircraft seat 102 may be translatable (e.g., trackable or slidable). The aircraft seat 102 may be rotatable about an axis cross-wise through the aircraft seat 102 into a position including, but not limited to, the upright or raised position, the one or more lounge or reclined positions, and/or the lie-flat or bed position. The aircraft seat 102 may be rotatable about an axis (e.g., swivelable). The aircraft seat 102 may be fully positionable between the outer limits of motion as defined by the moveable components of the aircraft seat 102 and/or other monuments 208 of the passenger compartment 204. It is noted herein an upright or raised position may be considered a taxi, takeoff, or landing (TTOL) position during select stages of flight (though the upright or raised position is not limited to use during the select stages of flight as the TTOL position, but also may be used at any point during the flight), for purposes of the present disclosure. In addition, it is noted herein that any position that does not meet the above-defined requirements of the TTOL position may be considered a non-TTOL position, for purposes of the present disclosure. Further, it is noted herein the aircraft seat 102 may be actuatable (e.g., translatable and/or rotatable) from the TTOL position to a non-TTOL position, or vice versa. Further, it is noted herein the aircraft seat 102 may be capable of a fully upright or raised position, and that the TTOL position may have a more reclined seat back cushion 104 and a more angled upward seat pan cushion 200 as compared to the fully upright or raised position. Therefore, the above description should not be interpreted as a limitation on the present disclosure but merely an illustration.

The passenger compartment 204 may include a cavity or space 210. The aircraft seat 102 may be configured to fit within the cavity or space 210 when transitioning between positions (e.g., between the upright or raised position and the lie-flat or bed position), such that the auxiliary rear section 110 may include one or more different heights that may or may not be dependent on the position of the aircraft seat 102.

For example, the auxiliary rear section 110 may be at an extended height 212 relative to the head rest 106 when the aircraft seat 102 is in the upright or raised position. For instance, a top edge of the auxiliary rear section 110 may be at the extended height 212 relative to the head rest 106 when the aircraft seat 102 is in the upright or raised position. It is noted herein a surface of the auxiliary rear section 110 may be proximate to a surface of the head rest 106 when the auxiliary rear section 110 is at the extended height 212 relative to the head rest 106 (e.g., a front or forward-facing surface of the auxiliary rear section 110 may be proximate to an aft-facing or rearward-facing surface of the head rest 106).

By way of another example, the auxiliary rear section 110 may be at an intermediate height 212a relative to the head rest 106 at some point during a transition between positions (e.g., between the upright or raised position and the lie-flat or bed position) and/or at some point within a particular position (e.g., a lounge or reclined position).

By way of another example, the auxiliary rear section 110 may be at a retracted height 212b relative to the head rest 106 when the aircraft seat 102 is in the lie-flat or bed position. For instance, the retracted height 212b may be zero where the top edge of the auxiliary rear section 110 and the top edge of the head rest 106 are even or substantially even (e.g., flush or substantially flush). In addition, the retracted height 212b may be a negative height difference where the top edge of the auxiliary rear section 110 is lower than the top edge of the head rest 106 (e.g., in the case where the extended height 212 may be a positive height difference).

In this regard, the privacy shell 206 (and thus the passenger compartment 204) may not need to be configured to include additional geometrical constraints to accommodate an extended auxiliary rear section 110, as the auxiliary rear section 110 may be retracted when the aircraft seat 102 is in the lie-flat or bed position.

As illustrated in the transition between FIGS. 2A-2C, a transition of the auxiliary rear section 110 between an extended position and a retracted position may occur smoothly with the transition of the aircraft seat 102 between the upright or raised position and the lie-flat or bed position. For example, the aircraft seat 102 may include one or more mechanical assemblies and/or one or more electrical assemblies (e.g., as described throughout the disclosure, including but not limited to, cam followers or the like) that cause the transitioning of the auxiliary rear section 110 to follow the transitioning of the aircraft seat 102 as a whole.

As illustrated in the transition between FIGS. 3A-3D, a transition of the auxiliary rear section 110 between an extended position and a retracted position may occur prior to the transition of the aircraft seat 102 between the upright or raised position and the lie-flat or bed position. For example, the aircraft seat 102 may include one or more mechanical assemblies and/or one or more electrical assemblies (e.g., as described throughout the disclosure) that cause the transitioning of the auxiliary rear section 110 to be triggered as the aircraft seat 102 is disengaged from (e.g., leading to retraction) or engaged in (e.g., leading to extension) the upright or raised position.

Although embodiments of the disclosure illustrate the auxiliary rear section 110 may be extended (and/or retracted) automatically, it is noted herein the auxiliary rear section 110 may be extended (and/or retracted) manually. For example, the aircraft seat 102 may be configured such that a flight attendant or other crew member and/or a passenger may be able to extend and/or retract the auxiliary rear section 110. Therefore, the above description should not be interpreted as a limitation on the present disclosure but merely an illustration.

It is noted herein the aircraft seat 102 may include one or more mechanical assemblies and/or one or more electrical assemblies (e.g., as described throughout the disclosure) configured to prevent the auxiliary rear section 110 from transitioning when the aircraft seat 102 is in the lie-flat or bed position. In addition, it is noted herein the aircraft seat 102 may include one or more mechanical assemblies and/or one or more electrical assemblies (e.g., as described throughout the disclosure) configured to prevent the auxiliary rear section 110 from transitioning when the aircraft seat 102 is in the upright or raised position. Therefore, the above description should not be interpreted as a limitation on the present disclosure but merely an illustration.

The aircraft seat 102 may be proximate to an ottoman 214. For example, the aircraft seat 102 and the ottoman 214 may form the lie-flat surface when the aircraft seat 102 and the ottoman 214 are each in a lie-flat or bed position.

The ottoman 214 may be positioned underneath and/or proximate to at least some of the one or more monuments 208 of the passenger compartment 204. For example, the monument 208 may include, but is not limited to, a side stand, a tray or table, or the like. Where the monument 208 includes a tray or table, the tray or table may include a top surface, a bottom surface, and/or one or more side surfaces. For example, the tray may include a single continuous side surface where all corners are rounded. By way of another example, the tray may include up to an N number of side surfaces where the tray includes up to an N number of corners. The tray or table may be fixed in position. It is noted herein, however, that the tray or table may be actuatable (e.g., may extend a select distance from a stowed position to an extended position proximate to a passenger).

The ottoman 214 may be positioned within a footwell 216 of the passenger compartment 204. For instance, one or more dimensions of the footwell 216 may be changed by transitioning the aircraft seat 102 between the upright or raised position, a lounge or reclined position, and/or the lie-flat or bed position. It is noted herein that a portion of the ottoman 214 may be actuatable (e.g., along a set of tracks or linear rails) to a position outside of the footwell 216.

The ottoman 214 may be configured to translate and/or rotate about an axis through a sidewall of the ottoman to point a top surface to a passenger occupying the aircraft seat 102. For example, where the ottoman 214 may be configured to both translate and rotate, the ottoman 214 may be configured to independently rotate and/or translate. By way of another example, where the ottoman 214 may be configured to both translate and rotate, a rotation may prevent further translation until the ottoman 214 is returned to a select position and/or a translation may prevent further rotation until the ottoman 214 is returned to a select position.

It is noted herein, however, the aircraft seat 102 and/or the ottoman 214 may be limited to an upright or raised position and/or one or more lounge or reclined positions. In addition, it is noted herein the aircraft seat 102 may be the sole component forming a bed when the aircraft seat 102 is in a lie-flat or bed position. Therefore, the above description should not be interpreted as a limitation on the present disclosure but merely an illustration.

Although embodiments of the disclosure illustrate the auxiliary rear section 110 as including a similar aesthetic to the primary rear section 108, it is noted herein the auxiliary rear section 110 may be independently shaped as compared to the primary rear section 108.

FIG. 4 illustrates the aircraft cabin 100 including the one or more aircraft seats 102, in accordance with one or more embodiments of the disclosure. In FIG. 4, the auxiliary rear section 110 may include one or more design elements including, but not limited to, one or more holes or open areas 400 within one or more members forming the auxiliary rear section 110, the one or more members including one or more outlines, or similar design elements that differ from one or more design elements of the head rest 106.

The auxiliary rear section 110 may be coupled to the primary rear section 108. The auxiliary rear section 110 may be extendable and retractable along an exterior surface of the primary rear section 108. For example, the auxiliary rear section 110 may be extendable and retractable via one or more mechanical assemblies. For instance, the one or more mechanical assemblies may include, but are not limited to, a combination of toggles (e.g., buttons, switches, levers, or the like), linkages, cam followers, cables, gears, interlocking assemblies, or the like. By way of another example, the auxiliary rear section 110 may be extendable and retractable via one or more electrical assemblies. For instance, the one or more electrical assemblies may include, but are not limited to, one or more actuators (e.g., motors, or the like). In addition, the auxiliary rear section 110 may be extendable and retractable via a combination of one or more mechanical assemblies and one or more electrical assemblies (e.g., one or more motors coupled to one or more mechanical assembly components, or the like).

The auxiliary rear section 110 may include one or more different heights that may or may not be dependent on the position of the aircraft seat 102.

For example, the auxiliary rear section 110 may be at an extended height 402 relative to the head rest 106 when the aircraft seat 102 is in the upright or raised position. For instance, a top edge of the auxiliary rear section 110 may be at the extended height 402 relative to the head rest 106 when the aircraft seat 102 is in the upright or raised position.

By way of another example, the auxiliary rear section 110 may be at a retracted height 402a relative to the head rest 106 when the aircraft seat 102 is in the lie-flat or bed position. For instance, the retracted height 402a may be a positive height difference where the top edge of the auxiliary rear section 110 remains taller than the top edge of the head rest 106, though still shorter than the positive height difference of the extended height 402. In addition, the retracted height 402a may be zero where the top edge of the auxiliary rear section 110 and the top edge of the head rest 106 are even or substantially even (e.g., flush or substantially flush). Further, the retracted height 402a may be a negative height difference where the top edge of the auxiliary rear section 110 is lower than the top edge of the head rest 106 (e.g., in the case where the extended height 402 may be a positive height difference).

Although embodiments of the disclosure illustrate the auxiliary rear section 110 as being offset a select distance from a passenger as compared to a distance between the head rest 106 and the passenger, it is noted herein the head rest 106 and the auxiliary rear section 110 may be the same component of the aircraft seat 102. In addition, although embodiments of the disclosure illustrate the auxiliary rear section 110 as being not cushioned or including only some cushion, it is noted herein the head rest 106 and the auxiliary rear section 110 may be the same component of the aircraft seat 102 with full cushioning.

FIGS. 5A and 5B illustrate the aircraft cabin 100 including one or more aircraft seats 102, in accordance with one or more embodiments of the disclosure. In FIGS. 5A and 5B, the head rest 106 may be configured to extend or retract from a hole or cut-out 500 via one or more internal assemblies. For example, the head rest 106 may be extendable and retractable via one or more mechanical assemblies. For instance, the one or more mechanical assemblies may include, but are not limited to, a combination of toggles (e.g., buttons, switches, levers, or the like), linkages, cam followers, cables, gears, interlocking assemblies, or the like. By way of another example, the head rest 106 may be extendable and retractable via one or more electrical assemblies. For instance, the one or more electrical assemblies may include, but are not limited to, one or more actuators (e.g., motors, or the like). In addition, the head rest 106 may be extendable and retractable via a combination of one or more mechanical assemblies and one or more electrical assemblies (e.g., one or more motors coupled to one or more mechanical assembly components, or the like). The hole or cut-out 500 may allow for the head rest 106 to retract into a cavity defined within the seat back cushion 104, within the primary rear section 108, or within both the seat back cushion 104 and the primary rear section 108. It is noted herein, however, that the head rest 106 being extendable may cause concern for the aft-facing or rearward-facing aircraft seats 102 appearing aesthetically different from the forward-facing aircraft seats 102 within the aircraft cabin 100.

The head rest 106 may include one or more different heights that may or may not be dependent on the position of the aircraft seat 102.

For example, the head rest 106 may be at an extended height 502 relative to the hole or cut-out 500 when the aircraft seat 102 is in the upright or raised position. For instance, a top edge of the head rest 106 may be at the extended height 402 relative to the hole or cut-out 500 when the aircraft seat 102 is in the upright or raised position.

By way of another example, the heat rest 106 may be at a retracted height 502a relative to the hole or cut-out 500 when the aircraft seat 102 is in the lie-flat or bed position. For instance, the head rest 106 may be a positive height difference where the top edge of the head rest 106 remains taller than the hole or cut-out 500, though still shorter than the positive height difference of the extended height 502. In addition, the retracted height 502a may be zero where the top edge of the head rest 106 and the hole or cut-out 500 are even or substantially even (e.g., flush or substantially flush). Further, the retracted height 502a may be a negative height difference where the top edge of the head rest 106 is lower than (e.g., fully within) the hole or cut-out 500 (e.g., in the case where the extended height 502 may be a positive height difference).

In this regard, the auxiliary rear section 110 may be configured to extend and retract, to allow the aircraft seat 102 to meet the minimum seat back height requirement, set forth by the SAE AS 8049 § 3.2.10 in a reduced amount of floor space of the aircraft cabin 100. In addition, the auxiliary rear section 110 may be configured to extend and retract, to allow the aircraft seat 102 to fit within the passenger compartment 204 of the aircraft cabin 100 without the passenger compartment 204 being modified to include additional geometrical constraints to accommodate the minimum seat back height requirement, set forth by the SAE AS 8049 § 3.2.10 (e.g., requiring an extended length, requiring a reduced seat pitch, requiring additional seat translation, or the like).

Although embodiments of the disclosure are directed to an aviation environment, it is noted herein the auxiliary rear section 110 is not limited to aircraft seats 102 within the aviation environment and/or the aircraft components within the aviation environment. For example, the auxiliary rear section 110 may be configured to operate in any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. For instance, the vehicle may include an automobile. By way of another example, the auxiliary rear section 110 may be coupled to and/or configured to operate with apparatuses sold for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft seat, comprising:
   a seat pan cushion coupled to a seat base;
   a seat back cushion;
   a head rest coupled to the seat back cushion; and
   an auxiliary rear section positioned behind a rear surface of the head rest, the auxiliary rear section configured to transition between an extended position and a retracted position, the auxiliary rear section being extendable and retractable from a cavity defined within a primary rear section, when the auxiliary rear section is in the retracted position, the auxiliary rear section is stowed within the cavity defined by the primary rear section,
   the seat pan cushion and the seat back cushion configured to transition between an upright position and a bed position,
   the auxiliary rear section configured to be in the extended position when the seat pan cushion and the seat back cushion are in the upright position,
   the auxiliary rear section configured to be in the retracted position when the seat pan cushion and the seat back cushion are in the bed position.

2. The aircraft seat of claim 1, wherein the auxiliary rear section being configured to transition from the extended position to the retracted position while the seat pan cushion and the seat back cushion transition from the upright position to the bed position.

3. The aircraft seat of claim 2, wherein the auxiliary rear section being configured to transition from the retracted position to the extended position while the seat pan cushion and the seat back cushion transition from the bed position to the upright position.

4. The aircraft seat of claim 1, wherein the auxiliary rear section being configured to transition from the extended position to the retracted position before the seat pan cushion and the seat back cushion transition from the upright position to the bed position.

5. The aircraft seat of claim 4, wherein the auxiliary rear section being configured to transition from the retracted position to the extended position after the seat pan cushion and the seat back cushion transition from the bed position to the upright position.

6. The aircraft seat of claim 1, wherein the aircraft seat comprises:
   the primary rear section, the auxiliary rear section coupled to the primary rear section, a surface of the auxiliary rear section being proximate to a surface of the head rest when the auxiliary rear section is in the extended position.

7. The aircraft seat of claim 6, wherein a top edge of the auxiliary rear section being at an extended height relative to the head rest when the auxiliary rear section is in the extended position.

8. The aircraft seat of claim 7, wherein the top edge of the auxiliary rear section being at a retracted height relative to the head rest when the auxiliary rear section is in the retracted position.

9. The aircraft seat of claim 6, wherein the auxiliary rear section is configured to transition between the extended position and the retracted position via the cavity defined within the primary rear section.

10. The aircraft seat of claim 6, wherein the auxiliary rear section is configured to transition between the extended position and the retracted position along an exterior surface of the primary rear section.

11. A passenger compartment of an aircraft cabin, comprising:
    a privacy shell; and
    an aircraft seat positioned within the privacy shell, the aircraft seat comprising:
       a seat pan cushion coupled to a seat base;
       a head rest coupled to the seat back cushion; and
       an auxiliary rear section positioned behind a rear surface of the head rest, the auxiliary rear section configured to transition between an extended position and a retracted position, the auxiliary rear section being extendable and retractable from a cavity defined within a primary rear section, when the auxiliary rear section is in the retracted position, the auxiliary rear section is stowed within the cavity defined by the primary rear section,
       the seat pan cushion and the seat back cushion configured to transition between an upright position and a bed position,
       the auxiliary rear section configured to be in the extended position when the seat pan cushion and the seat back cushion are in the upright position,
       the auxiliary rear section configured to be in the retracted position when the seat pan cushion and the seat back cushion are in the bed position.

12. The passenger compartment of claim 11, wherein the passenger compartment further comprises:
    an ottoman, the ottoman positioned proximate to the aircraft seat within the privacy shell.

13. The passenger compartment of claim 12, wherein the ottoman and the aircraft seat are configured to form a bed surface when the seat pan cushion and the seat back cushion are in the bed position.

* * * * *